United States Patent [19]

Loving

[11] Patent Number: 5,313,789
[45] Date of Patent: May 24, 1994

[54] SOLID FUEL TURBINE POWER PLANT AND METHOD

[75] Inventor: Ronald E. Loving, Semi Valley, Calif.

[73] Assignee: Hughes Aircraft Company, Los Angeles, Calif.

[21] Appl. No.: 889,734

[22] Filed: May 28, 1992

[51] Int. Cl.$^5$ .............................................. F02K 5/00
[52] U.S. Cl. ...................................... 60/246; 60/39.5; 60/269
[58] Field of Search ............... 60/246, 245, 251, 262, 60/264, 269, 39.142, 39.5

[56] References Cited

U.S. PATENT DOCUMENTS

| | | | |
|---|---|---|---|
| 2,985,104 | 5/1961 | Fox | 60/39.142 |
| 4,096,803 | 6/1978 | Kesting | 60/246 |
| 4,876,851 | 10/1989 | Mueller | 60/39.5 |
| 5,063,735 | 11/1991 | Colgren et al. | 60/246 |

*Primary Examiner*—Richard A. Bertsch
*Assistant Examiner*—W. J. Wicker
*Attorney, Agent, or Firm*—Wanda K. Denson-Low

[57] ABSTRACT

A low noise power plant (100) for providing thrust to a missile (102) having a solid fuel propellant (104) for generating a pressurized gas. A turbine (106) converts the pressurized gas to rotary motion and a drive shaft (108) transfers the rotary motion to a load (110). In a preferred embodiment, the power plant (100) is utilized to drive a projectile (102). A solid fuel stick (104) located within a combustion chamber (112) is ignited and burned to provide pressurized gas which is directed to the turbine (106) via an exhaust tube (114). The pressurized gas is at a relatively low pressure and volume which minimizes the generation of noise. The turbine (106) and the drive shaft (108) are each rotated by the pressurized gas. The gases expelled from the turbine (106) are near atmospheric pressure which further minimizes the generation of noise. The power of the rotating drive shaft (108) can be converted to useful power by a speed reduction gearbox (140). An output drive shaft (142) is employed to rotate a load such as a fan type propeller (110). The rotating fan type propeller (110) compresses air for generating the thrust of the power plant (100). The compressed air is a mixture of turbine exhaust gases and ambient air which reduces the heat content and thus, the detectability of the projectile (102) by infrared devices.

9 Claims, 4 Drawing Sheets

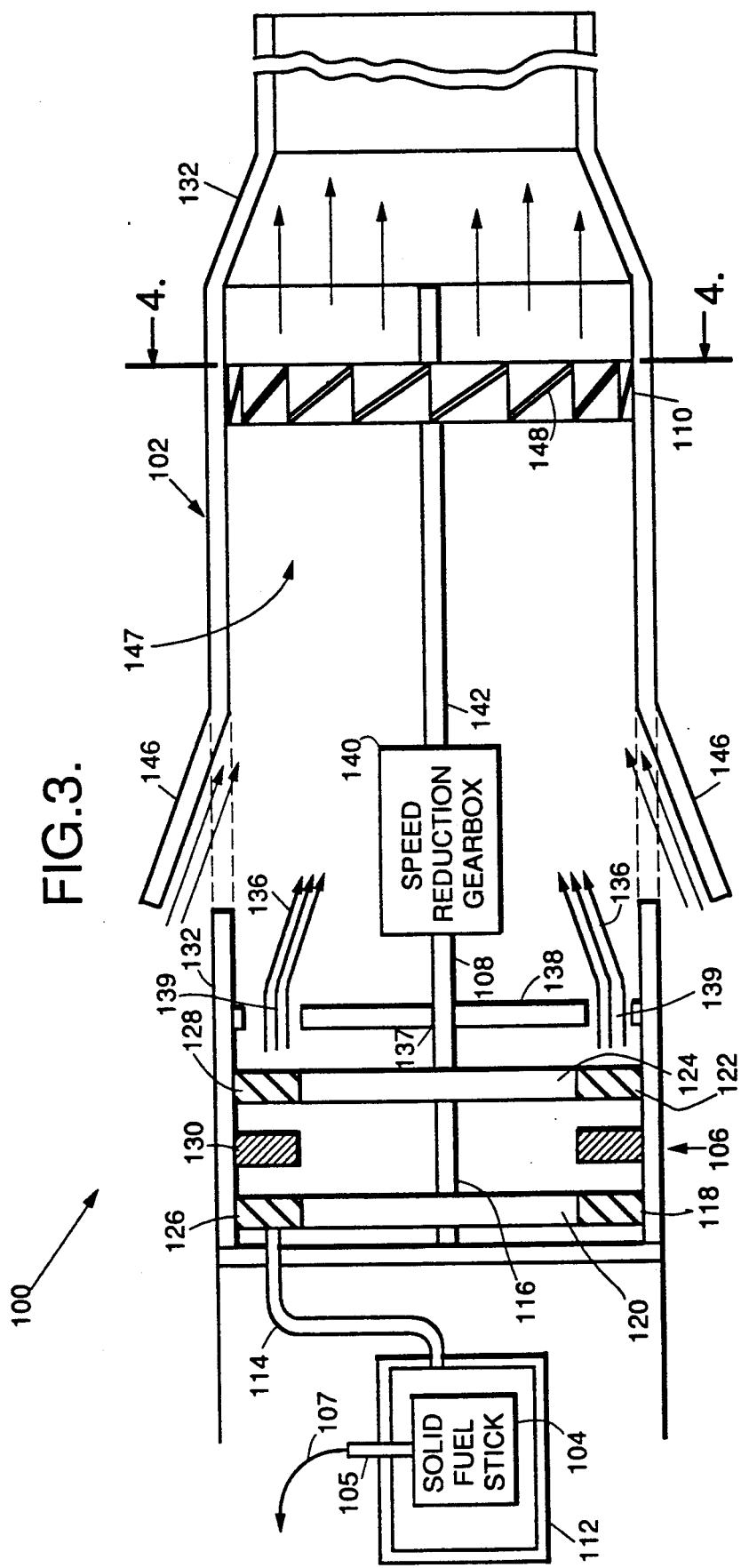

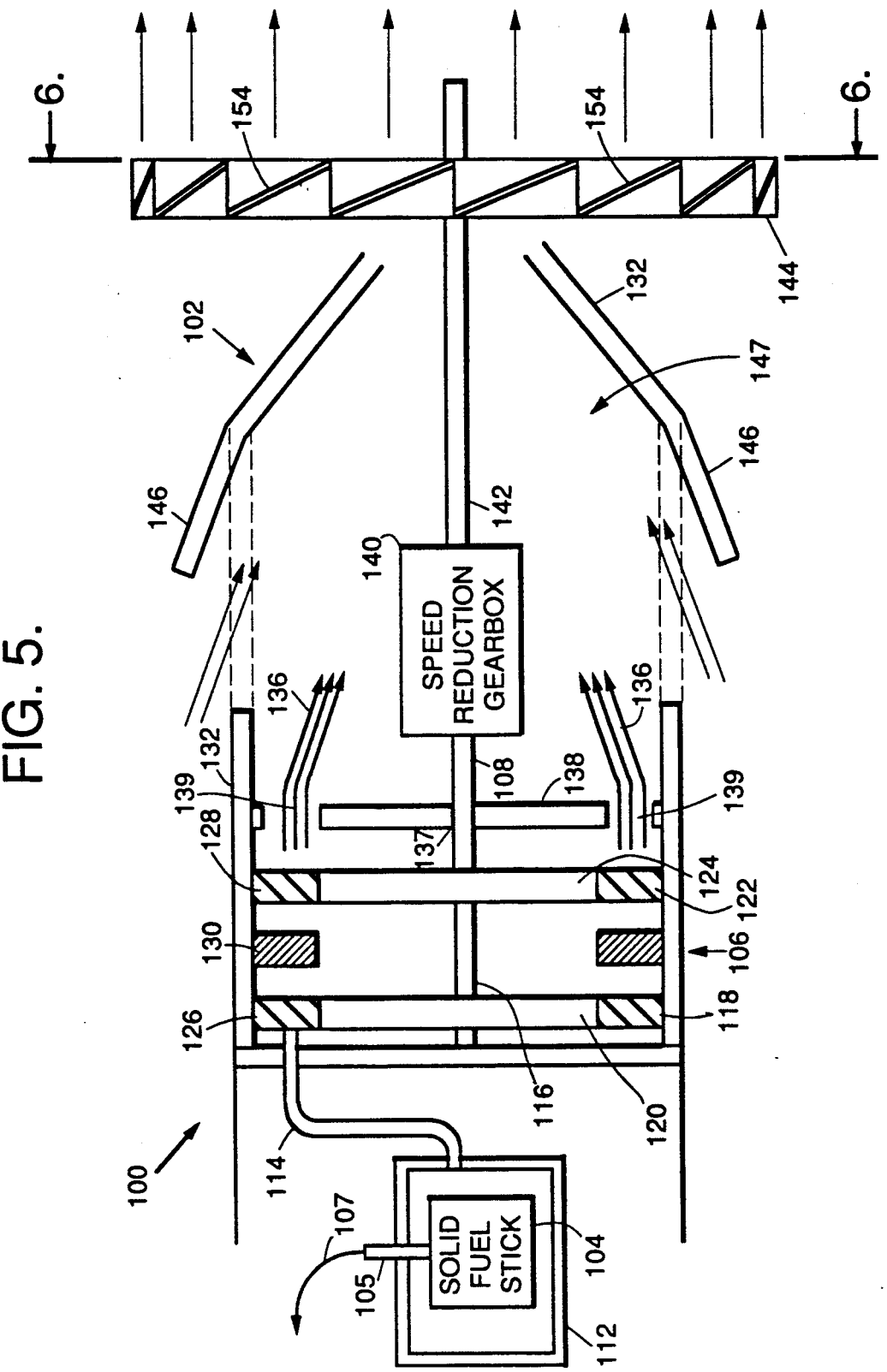

SOLID FUEL TURBINE POWER PLANT AND METHOD

BACKGROUND OF THE INVENTION

1. Field of the Invention

The present invention relates to turbine power plants. More specifically, the present invention relates to methods and apparatus for gas turbine power plants that employ solid fuel propellant.

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which the present invention would be of significant utility.

1. Description of the Related Art

Many different types of power plants are known in the art for providing thrust to propel a projectile. Examples include jet engines, piston engines and rocket motors of various designs. Each of these power plant designs suffer from a number of problems during the launch and flight stages of the projectile. The problems common to each power plant design include the generation of excessive noise and heat. Also, in the case of a rocket motor, large amounts of smoke can be generated.

Low detectability of a projectile during target approach is necessary in stealth operations. However, the generation of excessive noise during the launch and flight stages increases the probability that the projectile will be detected upon approach. Further, generation of large amounts of heat by the projectile can be detected by infrared sensors such as the forward looking infrared devices utilized by deployed ground troops and aircraft. The heat generated by the projectile can also be detected visually by utilizing night vision goggles. Likewise, the projectile can also produce a visible smoke trail. The visible smoke trail generated by certain rocket motors facilitates tracking the projectile and enables the determination of the origin of the launch point. The density of the smoke trail is dependent upon the type of rocket motor propellant employed. Each of these problems increase the probability of projectile detection during approach to the target.

Specific examples of power plant designs capable of providing thrust to propel a projectile include solid fuel rocket motors, air turbo rockets and jet turbine engines. Solid fuel rocket motors employing solid fuel propellants are known. The solid fuel propellant of certain rocket fuel motors burns at an accelerated rate producing a pressurized gas. The pressurized gas is then expelled from an exhaust nozzle at a supersonic rate to propel the projectile. In general, the burn rate of the solid fuel propellant is determined by the configuration of the solid fuel element employed. The amount of surface area of the solid fuel propellant exposed to burning determines the gas pressure generated. The more surface area of the solid fuel propellant exposed to burning, the higher the gas pressure generated. Solid fuel propellants having a large surface area exposed to burning tend to burn much faster. The generation of excessive noise, heat and smoke tend to increase the detectability of the projectile.

The second example of a power plant design capable of providing thrust to propel a projectile is an air turbo rocket. An air turbo rocket, which is known in the art, is capable of burning solid or liquid fuel to drive a turbine or compressor. The operation of the turbine or compressor produces increased gas pressure in an exhaust tube. When ambient air is funneled into the exhaust section of the air turbo rocket, the fuel is reignited and burned. This design effectively operates as an after burner. Because of the after burner effect, air turbo rockets are very noisy and are subject to audible detection. Liquid fuel is also utilized to provide thrust in other power plants such as in jet turbine engines. Numerous problems exist when attempting to contain liquid jet fuel in a fuel tank on a projectile. The utility and purity of the liquid jet fuel can be effected by the elements and by contamination. Additionally, the heavy mass of the liquid fuel adds to the load of the projectile during flight. Further, as the liquid fuel is consumed, the dynamics of the projectile are altered.

Unfortunately, the generation of excessive noise and heat tend to make the projectile power plant designs of the prior art vulnerable to detection by audible and infrared devices. Further, the creation of a visible smoke trail also causes the projectile to be easier to track. Therefore, the power plants of the prior art which are designed for use with a projectile are vulnerable to detection and are not suitable for use in stealth operations.

Thus, there is a need in the art for improvements in power plant designs for use with a projectile which exhibit the characteristics of low detectability and are suitable for use in stealth operations.

SUMMARY OF THE INVENTION

The need in the art is addressed by the low noise power plant for providing thrust to a missile and method of the present invention. The invention includes a solid fuel propellant for generating a pressurized gas. A turbine converts the pressurized gas to rotary motion and a drive shaft transfers the rotary motion to a load.

In a preferred embodiment, the power plant is utilized to drive a projectile. A solid fuel stick located within a combustion chamber is ignited and burned to provide pressurized gas which is directed to the turbine via an exhaust tube. The pressurized gas is at a relatively low pressure and volume which minimizes the generation of noise. The turbine and the drive shaft are each rotated by the pressurized gas. The gases expelled from the turbine are near atmospheric pressure which further minimizes the generation of noise. The power of the rotating drive shaft can be converted to useful power by a speed reduction gearbox. An output drive shaft is employed to rotate a load such as a fan type propeller. The rotating fan type propeller compresses air for generating the thrust of the power plant. The compressed air is a mixture of turbine exhaust gases and ambient air which reduces the heat content and thus, the detectability of the projectile by infrared devices.

3

Figure 1:
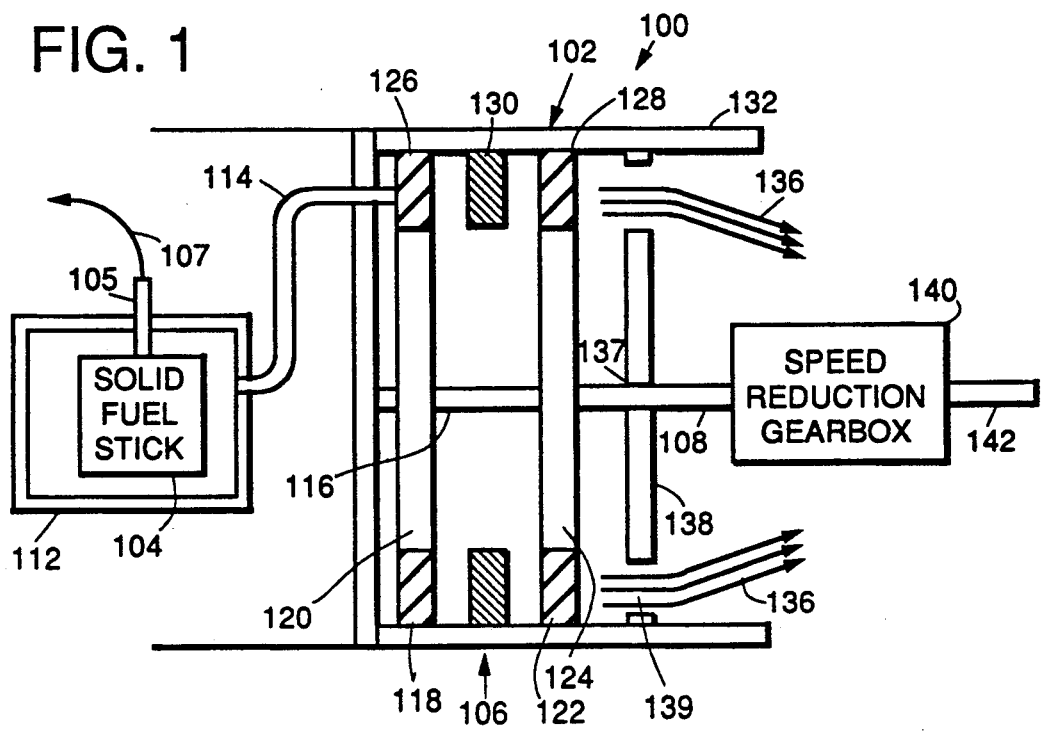
FIG. 1 is a simplified sectional side view of an illustrative embodiment of the solid fuel turbine power plant of the present invention positioned within a typical projectile tube.

FIG. 3 is a more detailed sectional side view of the solid fuel turbine power plant of FIG. 1 showing a ducted fan type propeller as a load positioned within the projectile tube.

Figure 4:
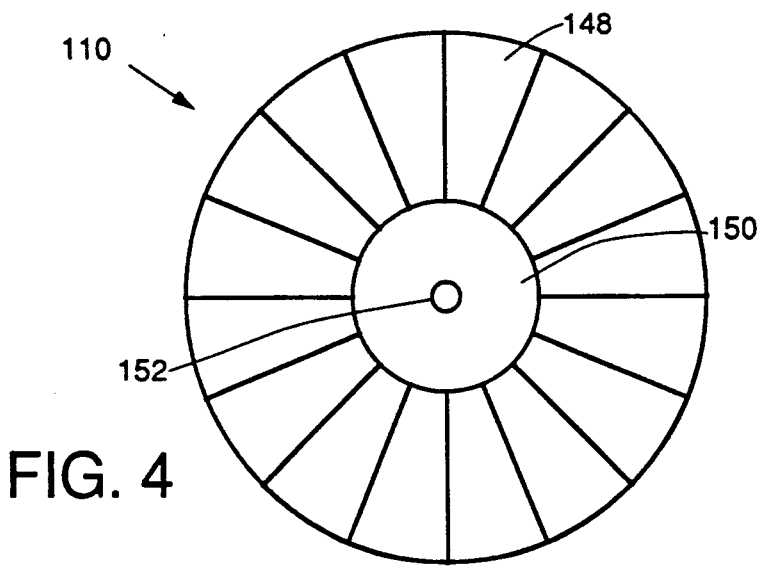

FIG. 4 is a simplified end view of the ducted fan propeller.

FIG. 5 is a more detailed sectional side view of the solid fuel turbine power plant of FIG. 1 showing an unducted fan type propeller as a load positioned external to the projectile tube.

Figure 6:
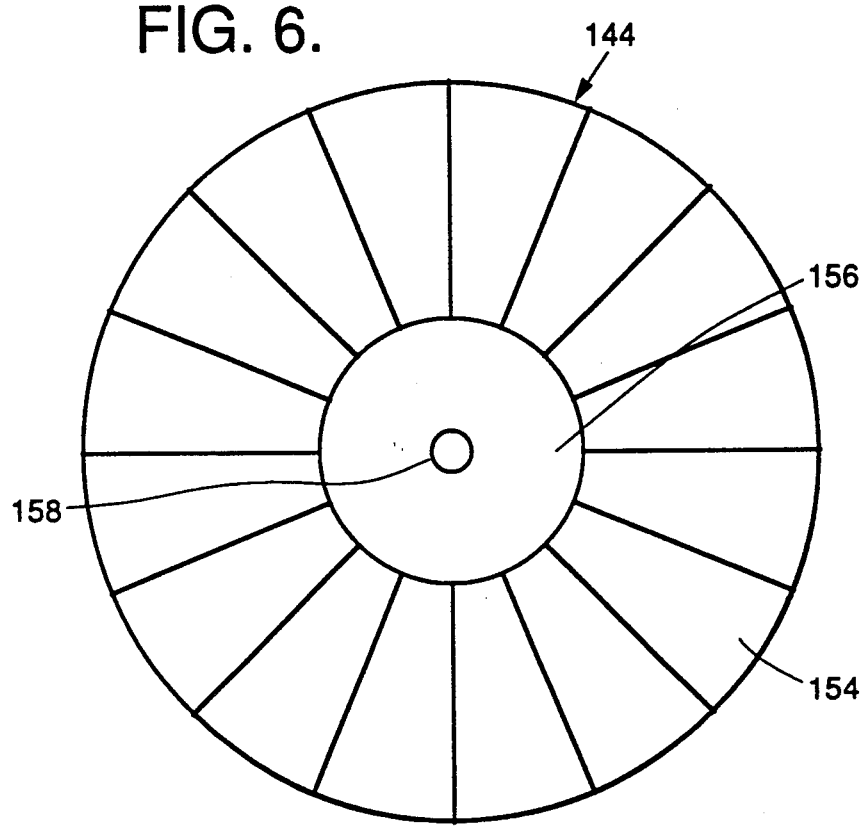

FIG. 6 is a simplified end view of the unducted fan type propeller of FIG. 5 showing a plurality of fan blades.

DESCRIPTION OF THE INVENTION

The invention is embodied in a solid fuel turbine power plant 100 located within a projectile 102 as shown in FIG. 1. The power plant 100 is of the type which includes a stick of solid fuel 104 for generating pressurized gases of a specified pressure and velocity. The solid fuel stick 104 preferably employed in the present invention is a slow burning stick in which only one end surface is ignited as is known in the art. For example, in an end-burning 2" diameter fuel stick, only one 2" end diameter is ignited. The diameter of the solid fuel stick 104 determines the amount of gas produced and the length of the stick determines how long the gases will be produced. Thus, the diameter of the fuel stick 104 and the burning rate control the pressure of the gases generated. By burning the solid fuel stick 104 and providing a pressurized gas source, high energy can be generated to produce thrust to propel the projectile 102.

The solid fuel stick 104 can be made from smokeless insensitive munitions propellant and have dimensions suitable for the intended application. The chemical base of the fuel stick 104 can be a nitro-based solid fuel, for example, nitrocellulose or nitroglycerin. Other chemical compositions are also available to serve as the fuel base of the fuel stick 104. The output of the solid fuel stick 104 is rated in the volume and pressure of the gases generated. The gases generated are determined by the type of solid fuel stick 104 employed. The gases generated include but are not limited to $CO_2$, $H_2$, $O_2$, $NO$ and $N_x$. The pressurized gases generated by the fuel stick 104 are at a relatively low pressure and volume which minimizes the generation of noise. When the power plant 100 is employed in the projectile 102, the output is rated in thrust. However, in commercial applications such as in driving a generator or wench, the output is rated in horsepower.

The solid fuel stick 104 is energized or ignited by a squib or igniter 105 as shown in FIGS. 1, 3 and 5. The squib 105 can be, for example, a glow plug which is controlled from a remote location such as a launch panel. Specifically, the squib 105 applies high temperature heat to the fuel stick 104 from a source (not shown) through a power lead 107 to achieve ignition and burning of the fuel stick 104. If the squib 105 functions as a glow plug for the specific fuel stick 104 utilized, the electrical energy provided through the power lead 107 may be continuous to sustain ignition and burning. However, other types of solid fuel sticks 104 having different burning characteristics may require only a pulse of electrical energy in the form of a spark to achieve ignition.

The solid fuel stick 104 is contained in a sealed pressure vessel or combustion chamber 112. The squib 105 and an exhaust tube 114 are shown penetrating the combustion chamber 112 in FIGS. 1, 3 and 5. The exhaust tube 114 is connected between the combustion chamber 112 and a turbine 106. The pressurized gases generated by the fuel stick 104 are directed through the exhaust tube 114 to spin the turbine 106 about a turbine axis 116 as described hereinbelow. Note that it is also possible to connect the exhaust tube 114 of the combustion chamber 112 to a manifold (not shown) and then to connect a plurality of exhaust tubes from the manifold to the turbine 106. In either case, the pressurized gases are directed to the turbine 106. The turbine 106 is of a conventional design comprising one or more turbine blade wheels.

The turbine 106 of the power plant 100 shown in FIGS. 1, 3 and 5 depicts a two stage turbine for illustration purposes only. It is to be understood that a single stage turbine or a multiple stage turbine (e.g., greater than one stage) can also be utilized. In general, multiple stage turbines impart greater efficiency and horsepower. It is further noted that the pressure range of the hot gases produced by the power plant 100 is also dependent upon the number of turbine stages and the number and shape of the blades per turbine stage. The turbine 106 includes a first turbine stage 118 having a first rotating wheel 120 and a second turbine stage 122 having a second rotating wheel 124. The end of the first rotating wheel 120 includes a first set of turbine blades 126 and the end of the second rotating wheel 124 includes a second set of turbine blades 128. Positioned between the first and second sets of turbine blades 126 and 128 is a stationary set of blades 130 commonly referred to as stators. Stators are utilized to condition or redirect the gases for the next turbine stage.

Figure 2:
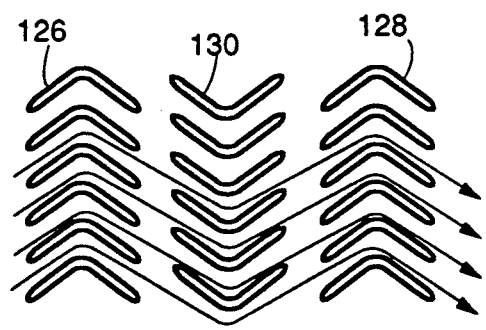
FIG. 2 is a schematic representation of the pressurized gas movement through the stages of the turbine of FIG. 1.

The pressurized gases generated by the solid fuel stick 104 are directed to the first turbine stage 118 by the exhaust tube 114. The path traveled by the gases through the first and second turbine stages 118 and 122 is schematically represented in FIG. 2. Since the first and second sets of turbine blades 126 and 128 are respectively connected to the first and second rotating wheels 120 and 124, then each set of turbine blades 126 and 128 also rotate. The pressurized gases initially strike the first set of turbine blades 126 which causes the first rotating wheel 120 of the first turbine stage 118 to rotate about the axis 116. The gases are then redirected to the stationary set of blades 130. The stationary set of blades 130 are mounted to an outer tube or metal housing 132 of the projectile 102 as shown in FIGS. 1, 3 and 5. In the example implementation, the shape of the stationary set of turbine blades 130 is opposed to that of the first and second sets of turbine blades 126 and 128 as shown in FIG. 2. Thus, a function of the stationary set of blades 130 is to redirect and condition the gases from the output of the first rotating wheel 120 to the second turbine stage 122. The stationary set of blades 130 also orients the gases to the correct angle to achieve the maximum energy transfer to the second turbine stage 122.

The gases are then directed from the stationary set of blades 130 to the second set of turbine blades 128. When the gases strike the second set of turbine blades 128, the second rotating wheel 124 is caused to rotate about the axis 116. In general, the first turbine stage 118 is approximately 75% efficient while the second turbine stage 122 is approximately 10% efficient. A third turbine stage, if employed, would be approximately 5% efficient with the remainder of the energy in the pressurized gases being lost as heat energy. The density, temperature and pressure of the gases emitted from the exhaust tube 114 will determine the rotational speed in RPM of the turbine 106. As an example, a turbine wheel having a diameter of 5" and a drive shaft length of 4"0 and weighing approximately five pounds can be rated to provide a forty horsepower output.

The exhaust gases (indicated by numeral 136) expelled from the second turbine stage 122 will be at or near atmospheric pressure. This indicates that the first and second turbine stages 118 and 122 have absorbed almost all of the energy contained in the gases. Therefore, noise is not likely to be generated by the gases. This feature further minimizes the generation of noise in the entire power plant 100 making it more difficult to detect with audible detection devices. Thus, the power plant 100 is more attractive for use in stealth type devices.

The exhaust gases 136 are then directed from an exhaust region of the turbine 106 to a diffuser plate 138 as shown in FIGS. 1, 3 and 5. In the example implementation of the present invention, the diffuser plate 138 is a metallic plate mounted to the inside surface of the outer tube 132 of the projectile 102. The diffuser plate 138 includes a penetration 137 for the passage of a drive shaft 108. One of the functions of the diffuser plate 138 is to direct the exhaust gases out of the exhaust region of the turbine 106 through a passageway 139 to a load such as a ducted fan type propeller 110 positioned within the projectile 102. Another function of the diffuser plate 138 is to absorb additional energy from the gases. This action causes the gases to slow down further minimizing the noise generated by the power plant 100.

The rotating drive shaft 108 can be connected to a speed reduction gearbox 140 to achieve the proper rotational speed for the load attached to the power plant 100. The load is attached to the power plant 100 via an output drive shaft 142 extending from the speed reduction gearbox 140 as shown in FIGS. 1, 3 and 5. It is noted that the speed reduction gearbox 140 can be of a conventional design and is an optional feature that may not be necessary in a particular load application. A plurality of loads can be driven by the power plant 100. When the power plant 100 is utilized to propel the projectile 102, an appropriate load is the ducted fan type propeller 110 shown in FIGS. 3 and 4 or an unducted fan type propeller 144 shown in FIGS. 5 and 6.

The metal housing or outer tube 132 of the projectile 102 includes a vent flap 146 shown in both FIGS. 3 and 5. The function of the vent flap 146 is to admit ambient air into the projectile 102. The ambient air is drawn into the projectile 102 by either the ducted fan type propeller 110 or the unducted fan type propeller 144. The ambient air is then mixed with the exhaust gases from the turbine 106 in a mixing chamber 147 to dissipate the heat contained therein. The dissipation of the heat in the exhaust gases makes the power plant 100 and the projectile 102 less vulnerable to detection by infrared type sensor devices. The mixture is then fed to either the ducted or unducted fan type propellers 110 or 144, respectively, to provide the thrust to propel the projectile 102.

The ducted fan type propeller 110 is internally located within the metal housing or outer tube 132 as shown in FIG. 3. The ducted fan type propeller 110 serves to provide the thrust to the projectile 102 by compressing (e.g., speeding up) the air as the air passes through the outer tube 132. Since the ducted fan type propeller 110 is located inside of the outer tube 132, it is usually smaller than and produces less thrust than the unducted fan type propeller 144 shown in FIGS. 5 and 6. An end view of a plurality of fan blades 148 of the ducted fan type propeller 110 is shown in FIG. 4. The end view of the ducted fan type propeller 110 is obtained by taking a cross-section of the outer tube 132 as shown in FIG. 3. The fan blades 148 are shown mounted to a center cog 150 having a penetration 152 for accommodating the output drive shaft 142. The fan blades 148 serve to compress the air mixture. The number of fan blades 148 and the RPM at which they rotate provide a certain level of thrust to the projectile 102. The RPM of the fan blades 148 is directly related to the output of the turbine 106 and the speed reduction gearbox 140, if used.

The unducted fan type propeller 144 is positioned external to the projectile 102 as shown in FIG. 5 and serves the identical function as the ducted fan type propeller 110 shown in FIG. 3. Since the unducted fan type propeller 144 is externally located, it can be much larger than the ducted fan type propeller 110. Therefore, the unducted fan type propeller 144 can produce a greater thrust for the same amount of energy expended by the solid fuel stick 104. For example, a twenty pound, 6" diameter projectile 102 fitted with an unducted fan type propeller 144 will produce more thrust and travel further than the same projectile fitted with the ducted fan type propeller 110.

A cross-sectional view of the unducted fan type propeller 144 illustrating a plurality of fan blades 154 is shown in FIG. 6. The fan blades 154 are shown mounted to a center cog 156 having a penetration 158 for accommodating the output drive shaft 142. The fan blades 154 also serve to compress the air mixture and the number of fan blades 154 and the RPM at which they rotate provide a certain level of thrust to the projectile 102. The RPM of the fan blades 154 is also directly related to the output of the turbine 106 and the speed reduction gearbox 140, if used.

The present invention employs a solid fuel stick 104 to provide pressurized gases to an efficient turbine 106 that rotates a drive shaft 108. The rotating drive shaft 108 operates a load such as a ducted or unducted fan type propeller 110 or 144 to generate sufficient thrust to propel a projectile 102. The present invention generates low levels of noise and heat which renders the power plant 100 and thus the projector 102 less vulnerable to detection by audible and infrared sensor type devices. Thus, the power plant 100 of the present invention is suitable for use in stealth type devices and in devices requiring a quiet, short term power source. If a smokeless propellant is employed, the power plant 100 does not produce smoke rendering it less detectable.

The present invention is useful as an inexpensive replacement power plant for solid/liquid fueled rockets and small jet and piston engines. The present invention is also compact, lightweight and can be made reusable in commercial applications by replacing the solid fuel stick 104. An example of a commercial application includes driving a small power wench or a d.c. generator for energizing a field radio to transmit a geographical position. The solid fuel stick 104 is a short duration power plant which can be designed to provide power for approximately two to five minutes.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such modifications, applications and embodiments within the scope of the present invention.

Accordingly,

What is claimed is:

1. A low noise solid fuel power plant for providing thrust to an aeronautical missile comprising:
   a solid fuel propellant for generating a pressurized gas;
   a turbine for converting said pressurized gas to rotary motion;
   a drive shaft rotated by said turbine for transferring said rotary motion;
   a diffuser plate surrounding said drive shaft and having a passageway formed therethrough for directing said pressurized gas away from said turbine;
   a vent flap for admitting ambient air into said missile;
   a chamber within said missile for mixing said ambient air with said pressurized gas; and
   a fan connected to said rotating drive shaft for generating thrust.

2. The low noise solid fuel power plant of claim 1 wherein said connected fan is a ducted fan type propeller.

3. The low noise solid fuel power plant of claim 2 wherein said ducted fan type propeller is internally positioned within said missile.

4. The low noise solid fuel power plant of claim 1 wherein said connected fan is an unducted fan type propeller.

5. The low noise solid fuel power plant of claim 4 wherein said unducted fan type propeller is positioned external to said missile.

6. A low noise aeronautical missile comprising:
   a housing; and
   a low noise power plant within said housing to provide thrust to said aeronautical missile, said power plant having,
   a solid fuel propellant for generating a pressurized gas;
   a turbine for converting said pressurized gas to rotary motion;
   a drive shaft rotated by said turbine for transferring said rotary motion;
   a diffuser plate surrounding said drive shaft and having a passageway formed therethrough for directing said pressurized gas away from said turbine;
   a vent flap for admitting ambient air into said missile;
   a chamber within said missile for mixing said ambient air with said pressurized gas; and
   a fan connected to said rotating drive shaft for generating thrust.

7. A method for operating a low noise solid fuel power plant for use with a aeronautical missile, said method comprising the steps of:
   generating a pressurized gas with a solid fuel propellant;
   converting said pressurized gas to rotary motion with a turbine;
   transferring said rotary motion of a drive shaft connected to said turbine;
   surrounding said drive shaft with a diffuser plate;
   directing said pressurized gas away from said turbine through a passageway formed in said diffuser plate;
   admitting ambient air into said aeronautical missile through a vent flap;
   mixing said ambient air with said pressurized gas in a chamber within said missile; and
   rotating a fan connected to said drive shaft for generating thrust to propel said aeronautical missile.

8. The method of claim 7 further including the step of internally positioning said fan within said aeronautical.

9. The method of claim 7 further including the step of positioning said fan external to said aeronautical missile.

* * * * *